Patented Apr. 16, 1940

2,197,350

UNITED STATES PATENT OFFICE 2,197,350

COPPER COMPLEX COMPOUNDS OF POLYAZO DYESTUFFS

Hans Schindhelm, Frankfort - on - the - Main-Fechenheim, and Carl Theo Schultis, Bergen, near Frankfort-on-the-Main, Germany, assignors to General Aniline & Film Corporation, a corporation of Delaware No Drawing. Original application December 18, 1935, Serial No. 55,043. Divided and this application November 11, 1937, Serial No. 174,010. In Germany June 19, 1935

5 Claims. (Cl. 260—145)

The present application is a division of our application Serial No. 55,043, filed December 18, 1935, which relates to polyazo dyestuffs.

Our present invention relates to new copper complex compounds of polyazo dyestuffs.

U. S. Patent No. 2,004,250 describes inter alia copper complex compounds of polyazo dyestuffs of the type:

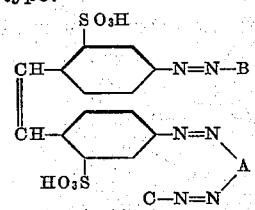

(in which formula A indicates a coupling component, containing two coupling positions, B a coupling component which may be alkylated, and C a radicle of an aromatic amine, containing in o-position to the amino group a group capable of being metallized).

According to the present invention valuable new copper complex compounds of a similar type are obtained by converting into their copper complex compounds polyazo dyestuffs which are obtained by diazotizing aminoazo dyestuffs of the type:

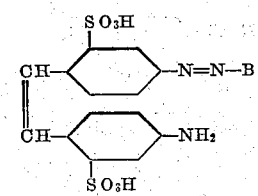

(wherein B stands for the radicle of a coupling component selected from the group consisting of anisole, salicylic acid, arylamides of aceto acetic acid and pyrazolones), combining the diazo compound thus obtained with a middle component selected from the group consisting of

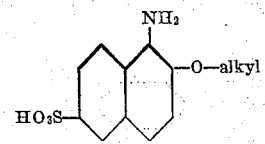

and

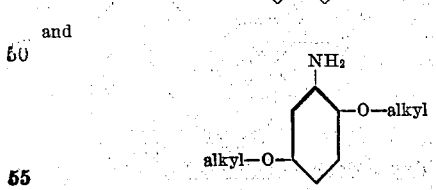

further diazotizing the azo dyestuffs formed and finally combining the diazo compound with a coupling component which contains in o-position to the coupling position a group capable of being metallized.

The new copper complex compounds thus obtained of the general formula:

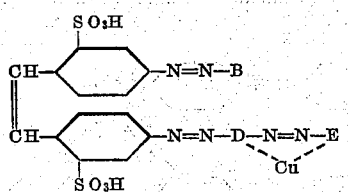

(wherein B has the above said signification, D stands for the radicle of a middle component selected from the group consisting of:

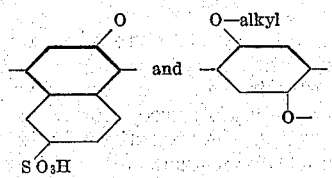

and E for the radicle of a coupling component which contains in o-position to the coupling position a group capable of being metallized) dye vegetable fibers bright shades of excellent fastness to light.

In order to further illustrate our invention the following examples are given, the parts being by weight and all temperatures in degrees centigrade.

Example 1

The diazo compound from 51.1 parts of the methylated monoazo dyestuff "4-nitro-2.2'-disulfo-stilbene-4'-azo-phenol" is combined with a solution of 28.9 parts of the sodium salt of 1-amino-2-naphthol-ethylether-6-sulfonic acid in a sodium carbonate solution. The diazo dyestuff thus formed may be purified by redissolving it and reprecipitating. Then it is diazotized and combined with a solution of 36 parts of the sodium salt of 2-(3'-carboxy-phenyl-amino)-5-naphthol-7-sulfonic acid, which solution also contains pyridine. When the combination is complete, the polyazo dyestuff is isolated by adding sodium chloride to the reaction mass.

The polyazo dyestuff thus obtained is when dry a violet black powder, soluble in concentrated sulfuric acid with a reddish brown and in water with a greenish blue color. It dyes cotton bluish green shades.

When the dyestuff is heated to boiling for some hours in an aqueous solution in the presence of sodium acetate and copper sulfate, it is converted into the corresponding copper complex compound of the formula:

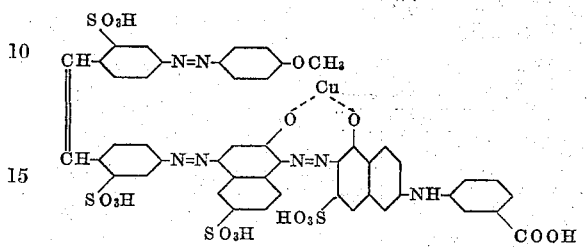

which is soluble in concentrated sulfuric acid with a violettish brown and in water with a yellowish green color and dyes cotton yellowish green shades of a particular fastness to light.

*Example 2*

When working as described in Example 1, but using as final component 30 parts of 1-acetyl-amino-8-naphthol-4-sulfonic acid the copper complex compound obtained of the formula:

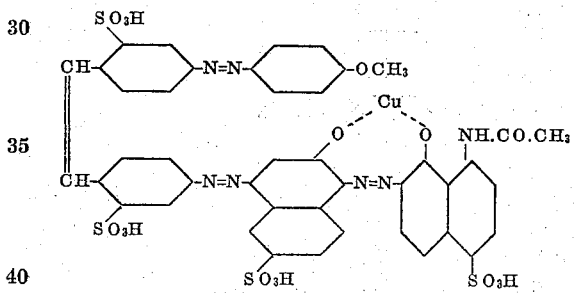

dyes cotton olive green shades of a very good fastness to light. It dissolves in concentrated sulfuric acid with a violettish brown and in water with a yellowish green color.

When coupling the diazotized aminoazo dyestuff "aminostilbene-disulfonic-acid-azo-anisol" with aminohydroquinone-dimethylether, diazotizing again and coupling finally with 2-naphthol-3.6-disulfonic acid, a polyazo dyestuff is obtained which is well fixed on cotton and dyes cotton bluish green shades. Its copper complex compound of the formula:

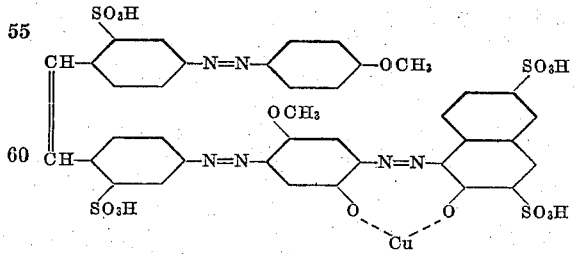

dyes cotton olive shades of an excellent fastness to light. It dissolves in water with a yellowish green and in concentrated sulfuric acid with a bluish violet color.

Similar dyestuffs are obtained by starting from amino-azo dyestuffs obtained by coupling the 4-nitro-4-aminostilbene-2.2'-disulfonic acid with salicylic acid or arylamides of aceto acetic acid or pyrazolone derivatives and by subsequently reducing the formed azo dyestuffs.

We claim:

1. Copper complex compounds of polyazo dyestuffs of the general formula:

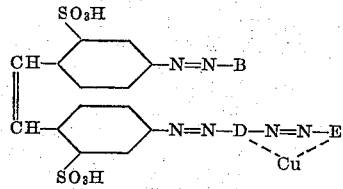

(wherein B stands for the radicle of a coupling component selected from the group consisting of anisole, salicylic acid, arylamides of aceto acetic acid and pyrazolones, D stands for the radicle of a middle component selected from the group consisting of:

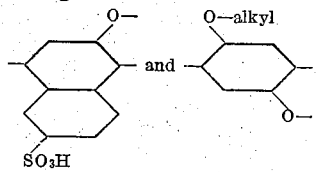

and E stands for the radicle of a coupling component which contains in o-position to the coupling position a group capable of being metallized), which copper complex compounds dye the vegetable fiber bright shades of an excellent fastness to light.

2. The copper complex compound of the formula:

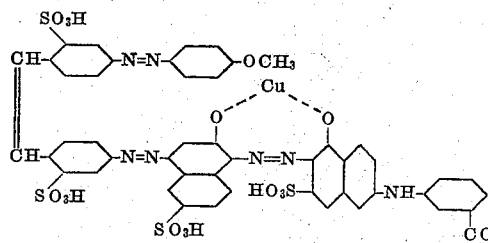

which is when dry a dark powder, soluble in concentrated sulfuric acid with a brownish violet and in water with a green color, dyeing cotton yellowish green shades of a particular fastness to light.

3. The copper complex compound of the formula:

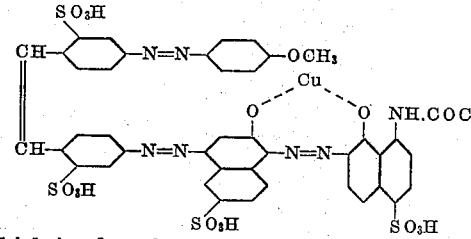

which is when dry a dark powder, soluble in concentrated sulfuric acid with a violettish brown and in water with a yellowish green color, dyeing cotton olive green shades of a very good fastness to light.

4. The copper complex compound of the formula:

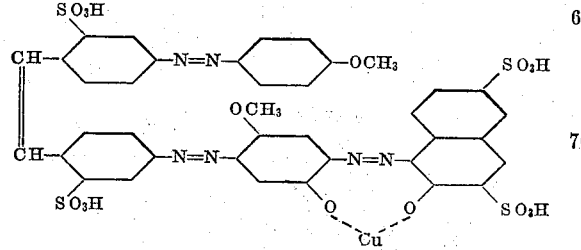

which is when dry a dark powder soluble in concentrated sulfuric acid with a bluish violet and in water with a yellowish green color, dyeing cotton olive shades of excellent fastness to light.

5. Copper complex compounds of polyazo dyestuffs of the general formula:

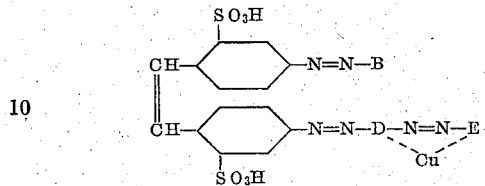

(wherein B stands for the radicle of a coupling component selected from the group consisting of anisole, salicyclic acid, arylamides of aceto acetic acid and pyrazolones, D stands for the radicle of a middle component selected from the group consisting of:

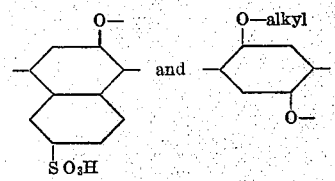

and E stands for the radicle of a coupling component of the naphthalene series which contains in o-position to the coupling position a group capable of being metallized), which copper complex compounds dye the vegetable fiber bright shades of an excellent fastness to light.

HANS SCHINDHELM.
CARL THEO SCHULTIS.